Figure 1:
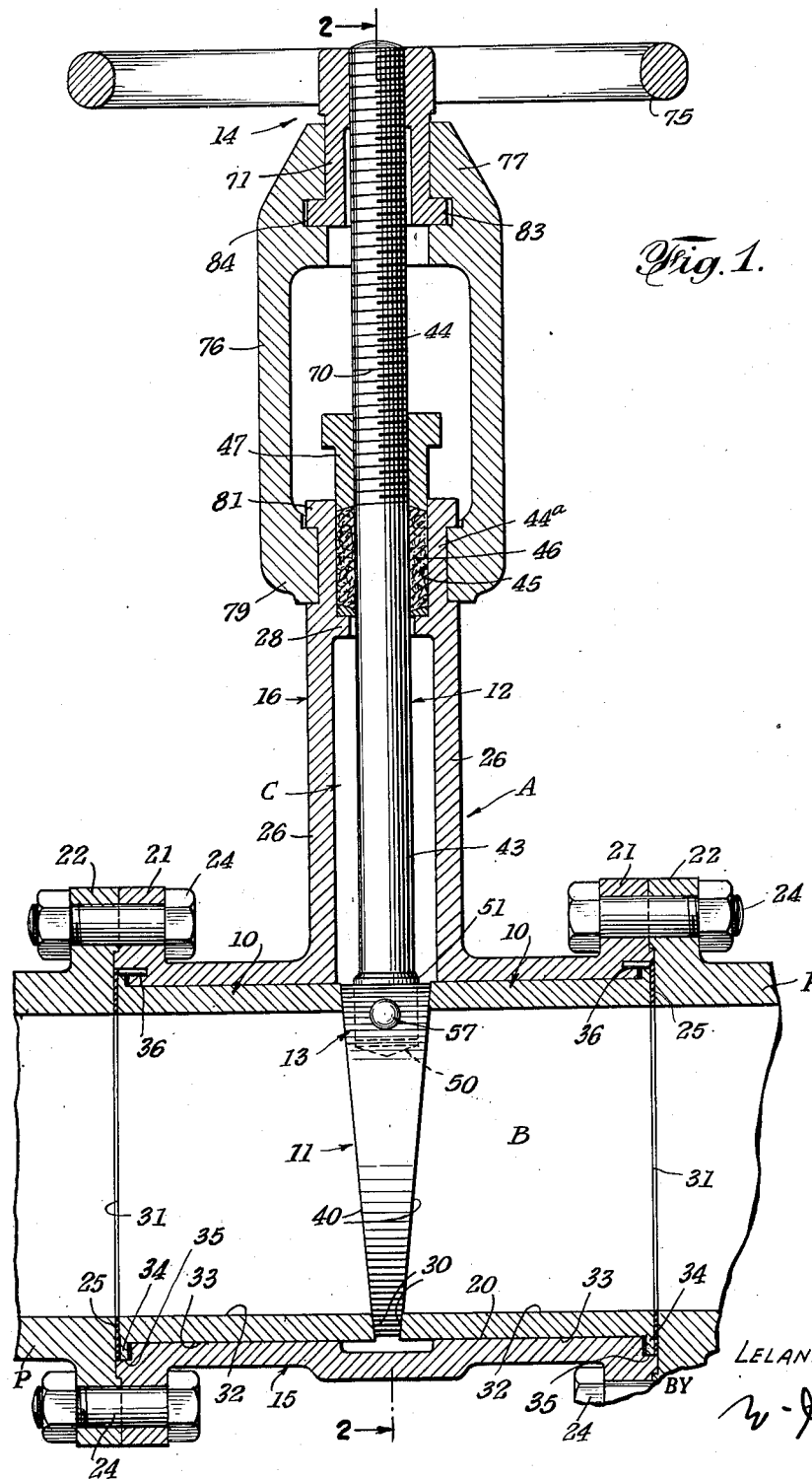

Nov. 4, 1952  L. S. HAMER  2,616,655
GATE VALVE
Filed May 21, 1945  2 SHEETS—SHEET 2
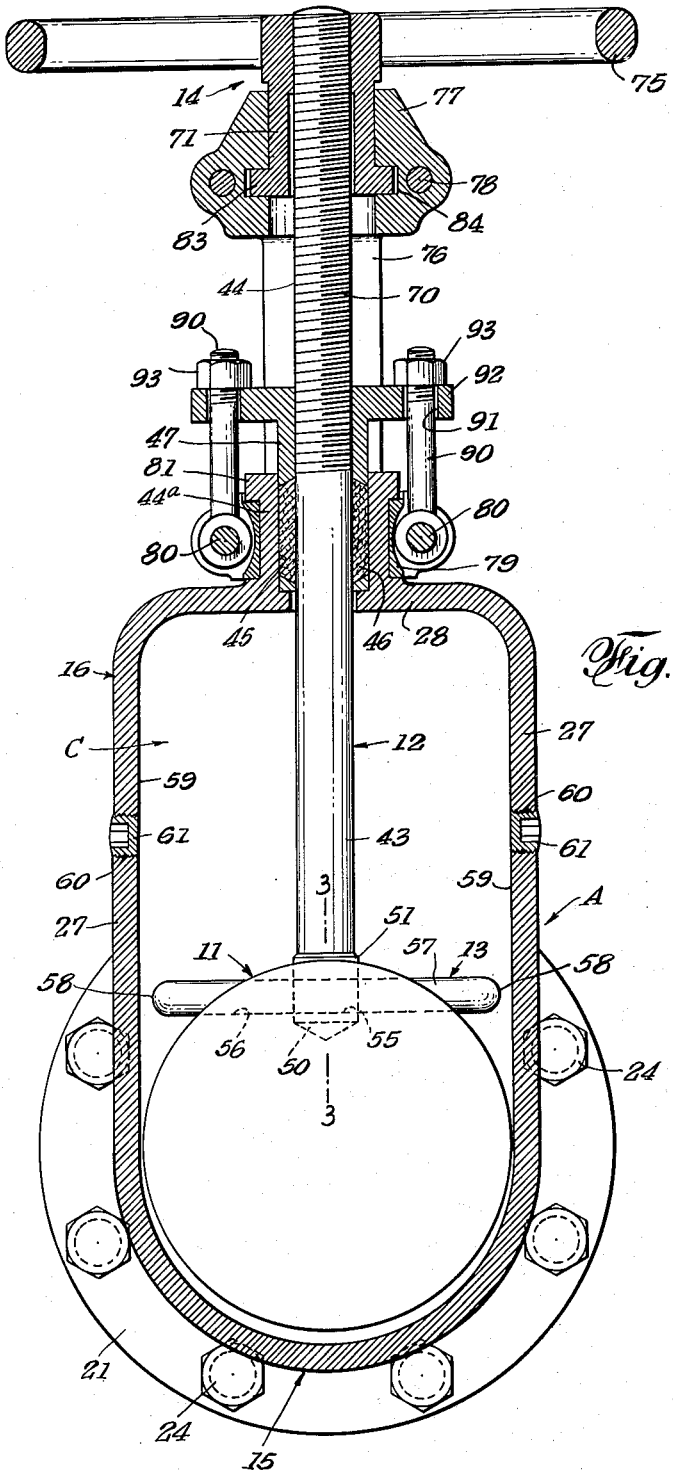
Fig. 2.
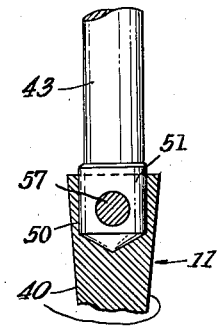
Fig. 3.
INVENTOR.
LELAND S. HAMER
BY
ATTORNEY Patented Nov. 4, 1952

2,616,655

UNITED STATES PATENT OFFICE 2,616,655

GATE VALVE

Leland S. Hamer, Long Beach, Calif., assignor of one-fourth to Paul A. Dewhirst, Los Angeles, Calif.

Application May 21, 1945, Serial No. 594,995

13 Claims. (Cl. 251—51)

This invention has to do with a gate valve and it is a general object of the invention to provide various improvements and simplifications in construction and arrangement of parts in a device of this character.

It is a general object of my present invention to provide a gate valve wherein there is a body with a flow passage and a gate chamber accommodating a gate operated by a stem that enters the body from the exterior thereof, which structure is characterized by a simple, dependable and practical coupling joining the gate with the stem.

Another object of the invention is to provide a construction of the general character referred to wherein connection between the stem and gate is made through a releasable coupling pin and wherein the body is provided with an access opening through which the pin can be engaged and which normally closed by a removable plug.

Another object of this invention is to provide a gate valve with a body having a main tubular section forming a flow passage, which section has removable liners entering it from both ends, either one of which liners is removable to allow insertion or removal of the gate which forms the closure of the valve.

Another object of the invention is to provide a construction of the general character referred to wherein the liners have their inner ends finished to form seats for the gate so that the structure has opposed gate receiving seats.

It is another object of the invention to provide a structure of the general character referred to in which the inner ends of the liners not only form seats but are inclined or pitched oppositely forming a tapered opening to receive the gate so that the gate can be tapered or wedge-shaped in order to effectively seat on the two liners through a wedging action.

It is another object of the present invention to provide a gate valve wherein the flow passage is provided with a removable liner the inner end of which is inclined and forms a seat for the gate so that the liner and gate cooperate to have a wedging action, and in which the gate is removable through the flow passage when the liner is removed.

Another object of my invention is to provide improvements in the operating means for the stem of a gate valve. By my construction I provide a simple, compact, inexpensive construction that is effective and dependable in operation.

Another object of my invention is to provide, generally, a gate valve of simple, inexpensive construction which is highly effective and dependable in operation, and which is compact and of minimum size.

Another object of my invention is to provide a gate valve of the character above referred to involving liners in the flow passage, in which the liners form direct conductors from pipe ends, or the like, connected to the valve at the gate of the valve. By my construction I provide for full carriage of the fluid handled through the liners, thereby minimizing possible leaks and providing an extremely simple, inexpensive construction for handling materials that may be corrosive. With my construction the liners can be inexpensively formed of high grade or corrosion resisting material while the body, generally, can be cast or otherwise formed of ordinary or inexpensive materials.

The various objects and features of my invention will be fully understood from the following detailed description of a typical preferred form and application of the invention, throughout which description reference is made to the accompanying drawings in which:

Fig. 1 is a longitudinal vertical detailed sectional view of a typical valve construction embodying the present invention, showing the gate or closure in elevation and in active or closed position. Fig. 2 is a transverse sectional view of the structure being a view taken substantially as indicated by line 2—2 on Fig. 1, the stem and gate of the structure being shown in elevation. Fig. 3 is a detailed sectional view taken as indicated by line 3—3 on Fig. 2, the stem being shown in elevation.

A typical structure embodying my present invention involves, generally, a body A having a flow passage B therethrough and a laterally disposed gate chamber C intersecting the flow passage, one or more removable liners 10 in the flow passage of the body handling the material carried by the valve and forming seating means for the gate, a gate 11 operable in the chamber C and forming a closure for the passage B, an operating stem 12 for the gate, means 13 for releasably connecting the gate with the stem, and means 14 for operating the stem so that it moves the gate.

The body A that I have provided includes, generally, a main tubular section 15 establishing the flow passage B, and a lateral projection or extension 16 joining the main section 15 intermediate its ends and accommodating the chamber C which intersects the passage B. The body of the structure is characterized by the fact that it is without the usual bonnet common to gate valves and it will be apparent from the drawings that my construction lends itself to simple, inexpensive manufacture of the body as a casting. Further, from the following description it will be apparent that the construction that I have provided is extremely simple of manufacture, as it is free of complicated or delicate machine operations.

The main section 15 of the body is in the nature of a straight tubular duct to form the flow passage B and in the preferred construction it has a straight bore 20 formed through it from one end to the other to slidably receive the liners 10, as hereinafter described. The ends of the section 15 are provided for connection with elements of a pipe line, or the like, and in the particular form of construction illustrated coupling flanges 21 are provided at the ends of the section 15 to receive companion flanges 22 on pipe sections P. I have shown bolts 24 coupling the flanges 21 and 22 and I have shown gaskets 25 arranged between the flanges to seal the connections.

The lateral extension 16 of the body is preferably formed integral with the main section 15 and projects laterally from one side, for instance, from the top side, of the section 15. The extension may be shaped in any suitable manner although I prefer to make it a chest-like structure having side walls 26, edge walls 27, and a top 28. It is to be observed that the extension 16, as thus formed, is free of the usual bonnet arrangement or detachable section that characterizes most gate valves. The chamber C formed in or by the extension 16 is adapted to receive the closure or gate 11 when the gate is retracted and, therefore, the space between the side walls 26 is sufficient to accommodate the thickness of the gate with clearance and the space between the edge walls 27 is sufficient to accommodate the width of the gate with clearance. By shaping the chamber C to accommodate the gate with only reasonable working clearance the gate is guided by the chamber.

In accordance with the broader aspects of my invention I provide a liner 10 in one end of the main section 15 and I form the inner end 30 of the liner at an angle relative to the longitudinal axis of the passage B to establish an inclined seat to receive the gate 11. It is further provided that the liner 10 thus establishing the seat with a gate should extend to the end of the body section 15 to be flush therewith, so that the outer end 31 of the liner engages the end of pipe section B, or the flange thereof, or the gasket 25 provided at the connection between the valve and the pipe section. In accordance with another phase of my invention I provide two such liners one in each end of the main section 15 of the body and I form the inner ends 30 of the two liners so that they are opposed and oppositely pitched to establish a wedge-shaped opening between them suitable for the reception of a tapered or wedge-shaped gate. Since the two liners may be identical except that their inner ends are oppositely pitched, I will proceed to describe one in detail, it being understood that such description is equally applicable to the other.

The liner 10 is a straight tubular element having a central opening 32 defining the passage B through the body section 15 and having an exterior 33 to slidably fit the opening 20 at the section 15. In accordance with my invention the cross sectional configuration of the parts just referred to can vary as circumstances require. However, in most cases it is practical to make these various parts round, in which case the opening 20 is in the form of a bore as is the opening 32 in the liner, and in such case the exterior 33 of the liner may be turned. In practice it is not necessary to provide a close or accurate fit between the liner and the body 15, but rather it is merely necessary to provide a reasonable sliding fit between these parts. The liner is adapted to be slid into the opening 20 from the end of section 15 and, therefore, it is desirable to provide a means for stopping the inward movement of the liner in its working position. In the form of the invention illustrated I show a flange 34 on the outer end portion of the liner 10 and I counterbore the outer end of the openings 20 at 35 to receive the flange. The flange seats in the counterbore to stop the liner in the desired longitudinal position in the section 15. When the inner end 20 of the liner is pitched or inclined to cooperatively receive the gate it is desired to hold or establish the liner in the proper rotative position in the opening 20. For the purpose just stated, I provide one or more orienting keys 36 which may be in the form of pins entering the counterbore 35 to engage suitable notches in the flange 34.

The inner end 30 of the liner is preferably made flat and is pitched or angularly disposed to be in a plane inclined relative to the longitudinal axis of the passage B. The manner in which the end 30 of the liner is pitched will be seen from Fig. 1 of the drawings. The inner end of the liner is made to extend into or to occur at the chamber C which intersects the passage B so that it is in a position to receive or to be engaged by the gate 11.

When the construction involves two like liners as I have suggested they have their inner ends opposed and oppositely pitched to form a downwardly converging opening for the reception of the gate 11.

The gate 11 in its preferred form is a simple disc-shaped member made slightly smaller in diameter than the bore 20 in the body section 15 and formed with flat pitched or convergent sides 40 corresponding in pitch to the ends 30 of the liners. The manner in which the sides of the gate are inclined and their relationship to the ends 30 of the liners will be apparent from Fig. 1 of the drawings. By making the gate 11 slightly smaller in diameter than the opening 20 it can be passed into and out of position in the body through the bore upon removal of either of the liners 10.

The stem 12 provided for operating the gate 11 enters the body preferably through the top 28 of the extension 16 and it has a lower section 43 that operates through the top 28 and in the chamber C and an upper section 44 which projects above the top 28. In the construction illustrated an upstanding boss 44ᵃ is provided on the top 28 and has a counterbore 45 extending into it from its upper end to carry packing 46. A follower 47 enters the bore 45 to compress the packing.

The means 13 that I have provided for releasably connecting the stem 12 with the gate 11 is an important feature of my invention. This means involves, primarily, telescopic engagement of the stem with the gate and a releasable coupling pin engaging the telescopically connected parts to normally hold them together. In the particular construction illustrated I provide a socket 50 in the top of the gate and I preferably make the socket in the form of a bore entering the top or thick portion of the gate. The stem is provided with a lower end part 51 finished to enter the socket 50 thus establishing a nesting of the stem in the gate. The portions of the stem and gate which thus fit together are provided with registering openings 55 and 56, respectively, which carry a coupling pin 57. The manner in which the pin couples the gate and stem is clearly illustrated in Figs. 2 and 3 of the drawings. The openings 55 and 56 are formed on a common axis which is transverse of the direction of the passage B through the body and which is normal to the axis of the stem 12. In accordance with my invention I make the coupling pin 57 long enough to project from either side of the gate where the opening 56 occurs so that the ends 58 of the pin occur close to the inner sides 59 of the edge walls 27 of the body extension 16. Through this relationship, which is shown clearly in Fig. 2 of the drawings, the pin cannot possibly become displaced in a manner to release the gate from the stem, since it is confined against any appreciable movement in either direction. In accordance with my invention I provide an access opening 60 in one edge wall 27 so that the pin 57 can be passed into the body from an operating position at the exterior thereof, or can be reached for the purpose of withdrawing it from the body. The access opening 60 is normally closed by a plug 61. In accordance with the preferred form of my invention I provide two registering or opposite access openings 61 in each wall 27 and each of the openings is normally closed by a plug 61. With this latter arrangement it is very simple to manipulate the pin 57, for instance, to insert the pin into position to couple the stem and gate, the stem and gate can be lined up by means of a tool inserted through one opening 60 while the pin 57 is inserted through the opposite opening. To remove the pin 57 a suitable tool can be arranged through one access opening to engage the pin and force it out through the other access opening. In the drawings I have shown the access openings positioned so that the pin 57 will register with them or come opposite them when the gate is in a somewhat elevated position in the chamber C. It is to be understood, however, that the openings 60 can be arranged at any point so that the pin can be removed when the gate is in any desired position in the body.

The operating means 14 provided for affecting operation of the stem 12 so that the gate is moved within the body includes, generally, threads 70 on the upper portion 44 of the stem, a nut 71 engaged with the threads of the stem, and a frame rotatably supporting the nut on the body.

The nut is provided with suitable means for rotating it, as for instance, with a hand wheel 75, and it is adapted to be held against axial movement by means of the frame which supports it on the body of the valve. The frame is preferably a sectional yoke-like structure involving spaced legs 76 with head parts 77 at their upper ends joined by bolts 78 and having collar parts 79 at their lower ends fitting around the boss 44ª and joined by bolts 80. The collar parts 79 when assembled are retained on the boss 44 by the bolts 80 and by a flange 81 on the upper end portion of the boss. The nut is held against axial movement in the assembled head sections by a flange 83 on the nut fitting a channel 84 formed by the head sections. With the construction just described, the nut 71 is free to rotate but is held against axial movement, but when the nut is rotated the stem is advanced either up or down depending upon the direction in which the nut is rotated. When the stem is forced down the gate wedges between the liners forcing them into tight seated engagement with pipe sections, or the like.

In accordance with my preferred construction the frame which carries the nut 71 also carries means for operating the follower 47 which engages the packing 46. In the preferred arrangement the bolts 80 which connect the collar sections 79 carry threaded posts 90 which extend upwardly through openings 91 in a flange 92 on the follower. Nuts 93 are threaded on the posts 90 above the flange 92. By tightening the nuts 93 on the posts 90 the follower is moved downward to compress the packing.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A valve including, a body with a flow passage extending longitudinally therethrough and a lateral gate chamber communicating with the passage, the chamber being defined by side walls in planes transverse of the passage and edge walls in planes parallel with the longitudinal axis of the passage, a removable seat member in the passage, a gate operable in the chamber to close the passage and removable from the body only through the passage when the seat member is removed therefrom, a stem in the chamber for operating the gate and having an end at the exterior of the body, and means releasably connecting the other end of the stem to the peripheral portion of the gate including, a coupling pin with its axis parallel with the plane of the gate, the pin being normally confined in active position by the said edge walls.

2. A valve including a body with a round longitudinal flow passage and a flat laterally disposed gate chamber communicating with the passage, the chamber being defined by side walls in planes normal to the passage and edge walls connecting the side walls, a removable seat member in the passage, a gate operable in the chamber to close the passage and removable from the body through the passage when the seat member is removed therefrom, a stem in the chamber for operating the gate, and means releasably connecting the stem and gate including a coupling pin having free sliding engagement with both the stem and gate and normally confined by said edge walls in active position holding the stem and gate together, one of the edge walls having an access opening at one edge of the chamber through which the pin can be reached to effect release of the gate from the stem.

3. A valve including a body with a flow passage and a lateral gate chamber communicating with the passage, the chamber being defined by side walls in planes normal to the passage and edge walls connecting the side walls, a removable seat member in the passage, a gate operable in the chamber to close the passage and removable from the body through the passage, an elongate stem entering the body for operating the gate from across the passage into the chamber, and means releasably connecting the inner end of the stem and the peripheral portion of the gate including a coupling pin having free sliding engagement with both the stem and gate and normally confined in active position by the said edge walls, the axis of the pin being parallel with the plane of the gate, one of the edge walls having an access opening through which the pin can be reached to effect release of the gate from the stem, the body including a removable plug normally closing the said opening.

4. A valve including a body with a flow passage and a lateral gate chamber communicating with the passage, the chamber being defined by side walls in planes normal to the passage and edge walls connecting the side walls, a removable seat member in the passage, a second seat in the body spaced from and opposing the said member, a disc shaped gate operable in the chamber to close the passage and removable from the body through the passage, the gate having seat engaging faces at opposite sides and extending to the periphery thereof, an elongate stem entering the body for operating the gate, and means releasably connecting the inner end of the stem and the peripheral portion of the gate including an end on the stem extending into a socket extending into the gate from the periphery thereof between said faces and a pin coupling said end of the stem with the gate, the pin having free sliding engagement with said end of the stem and the gate and being retained in operating position by said edge walls.

5. A valve including a body with a flow passage and a lateral gate chamber communicating with the passage, a removable seat member in the passage, the chamber being defined by side walls in planes normal to the passage and edge walls connecting the side walls, a second seat in the body spaced from and opposing the said member, a disc shaped gate operable in the chamber to close the passage and smaller in diameter than the passage to be removable from the body through the passage, the gate having seat engaging faces at opposite sides and extending to the periphery thereof, a stem for operating the gate, and means releasably connecting the stem and gate including an end on the stem slidably extending into a socket entering into the gate from the periphery thereof and between said faces and a pin having free sliding engagement with and coupling said end of the stem and the gate, the axis of the pin being parallel with the plane of the gate and the body having an access opening through which the pin can be reached to effect release of the gate from the stem, the pin being retained in operating position by said edge walls.

6. A valve including a body with a flow passage and a lateral gate chamber communicating with the passage, the chamber being defined by side walls in planes normal to the passage and edge walls connecting the side walls, a removable seat member in the passage, a disc shaped gate operable in the chamber to close the passage and smaller than the passage to be removable from the body through the passage, the gate having seat engaging faces extending to the periphery thereof, a stem for operating the gate, and means releasably connecting the stem and gate including, a coupling pin having free sliding engagement with both the stem and the gate, extending transverse of the stem in a direction parallel with the gate and releasable to disengage the gate from the stem, the body having an access opening through which the pin can be reached and which is normally closed by a removable plug, the gate having a socket entering it from its periphery and receiving the portion of the stem engaged by the pin and the pin being normally held in engagement with the stem and gate by the said edge walls.

7. A valve including a body with a tubular main section with a flow passage through it and with a single lateral opening and a closed lateral extension in communication with the opening and forming a gate chamber, the extension including side walls transverse of the flow passage and edge walls connecting the edges of the side walls, a removable seat member in the passage, a tapered disc shaped gate active to engage the seat member and close the passage and retractible into the chamber, the gate being removable from the body through the passage when the seat member is removed therefrom, a stem entering the body to operate the gate, and means releasably connecting the stem and gate including, a releasable coupling pin slidably engaging the stem and slidably engaging the gate at the thick portion thereof, one of the edge walls having an access opening through which the pin can be reached from the exterior of the body and which is normally closed by a removable plug, the pin being retained in operating position by said edge walls.

8. A valve including a body with a tubular main section with a flow passage through it and with a single lateral opening and a closed lateral extension in communication with the opening and forming a gate chamber, the extension including side walls transverse of the flow passage and edge walls connecting the edges of the side walls, a removable seat member in the passage, a tapered disc shaped gate active to close the passage and retractible into the chamber, the gate being removable from the body through the passage when the seat member is removed therefrom, a stem entering the body to operate the gate, and means releasably connecting the stem and gate including, a removable coupling pin having free sliding engagement with the thick portion of the gate and with the stem and extending normal to the stem and parallel with the gate, the pin being held in engagement with the stem and gate by said edge walls of the extension, the extension having an access opening through which the pin can be inserted and removed and which is normally closed by a removable plug, the gate having a seat engaging face extending to the periphery thereof and having a socket extending into it from the periphery receiving the portion of the stem engaged by the pin.

9. A valve including a one piece body with an elongate tubular main portion with a flow passage and having a lateral extension forming a closed gate chamber open only to the passage, the extension including side walls transverse of the flow passage and edge walls connecting the edges of the side walls, a wedge shaped gate disc operable in the chamber and removable from the body through the flow passage, an operating stem entering the chamber, a pin coupling the stem and disc removable through an access opening in the extension and confined between said edge walls of the extension, and liners engaged in the end portions of the said main part for the disc to wedge between them, one liner having its inner end finished to form a seat to seal with the disc, the axis of the access opening being in a plane normal to the axis of the said main portion of the body.

10. A valve including a one piece body with a tubular main portion with a flow passage and having a lateral extension forming a closed gate chamber open only to the passage, the extension including side walls transverse of the flow passage and edge walls connecting the edges of the side walls, a wedge shaped gate disc operable in the chamber and removable from the body through the flow passage, an operating stem entering the chamber, a pin coupling the stem and disc removable through an access opening in the extension and normally confined between said edge walls of the extension, and liners slidably engaged in the end portions of the said main part, the liners having their outer ends flush with the ends of the body at the outer ends of the passage and having their inner ends finished to form seats to receive the gate, the stem being engaged with the periphery of the gate.

11. A valve including a body with a flow passage and a lateral gate chamber communicating with the passage, a gate operable in the chamber to close the passage and removable from the body through the passage, a liner arranged in the passage and having an inclined end forming a seat for the gate, a stem for operating the gate, and means releasably connecting one end of the stem to the peripheral portion of the gate including a coupling pin slidably engaging the stem and gate, the axis of the pin being in a plane transverse of the longitudinal axis of the passage and the pin being normally confined between said edge walls.

12. A valve applicable to pipe sections, or the like, including, a body with a flow passage and a lateral gate chamber intersecting the passage, the body having means at the outer ends of the passage to join the body to the pipe sections, a wedge-shaped gate operable in the chamber and removable from the body through the passage, and liners slidably engaged in the body from the outer ends of the passage and having their inner ends inclined and forming spaced opposed seats for the gate, the outer ends of the liners being adapted to seat and bear against the pipe sections.

13. A valve applicable to pipe sections, or the like, including, a body with a flow passage and a lateral gate chamber intersecting the passage, the body having means at the outer ends of the passage to join the body to the pipe sections, a wedge-shaped gate operable in the chamber and removable from the body through the passage, liners slidably engaged in the body from the outer ends of the passage and having their inner ends inclined and forming spaced opposed seats for the gate, the outer ends of the liners being adapted to seat and bear against the pipe sections, and means keying the liners to the body against rotation in the passages.

LELAND S. HAMER.

REFERENCES CITED

The following references are of record in the file of this patent:

UNITED STATES PATENTS

| Number | Name | Date |
| --- | --- | --- |
| 871,085 | Claflin | Nov. 12, 1907 |
| 1,293,874 | Murray | Feb. 11, 1919 |
| 1,642,242 | Gray | Sept. 13, 1927 |
| 1,751,122 | Barker | Mar. 18, 1930 |
| 1,800,251 | Fox | Apr. 14, 1931 |
| 1,866,292 | Carlson | July 5, 1932 |
| 1,946,319 | Hodgson | Feb. 6, 1934 |
| 1,999,921 | Burkhardt | Apr. 30, 1935 |
| 2,030,458 | McKellar | Feb. 11, 1936 |
| 2,292,622 | De Craene | Aug. 11, 1942 |

FOREIGN PATENTS

| Number | Country | Date |
| --- | --- | --- |
| 104,157 | Switzerland | of 1924 |